(No Model.) 4 Sheets—Sheet 4.

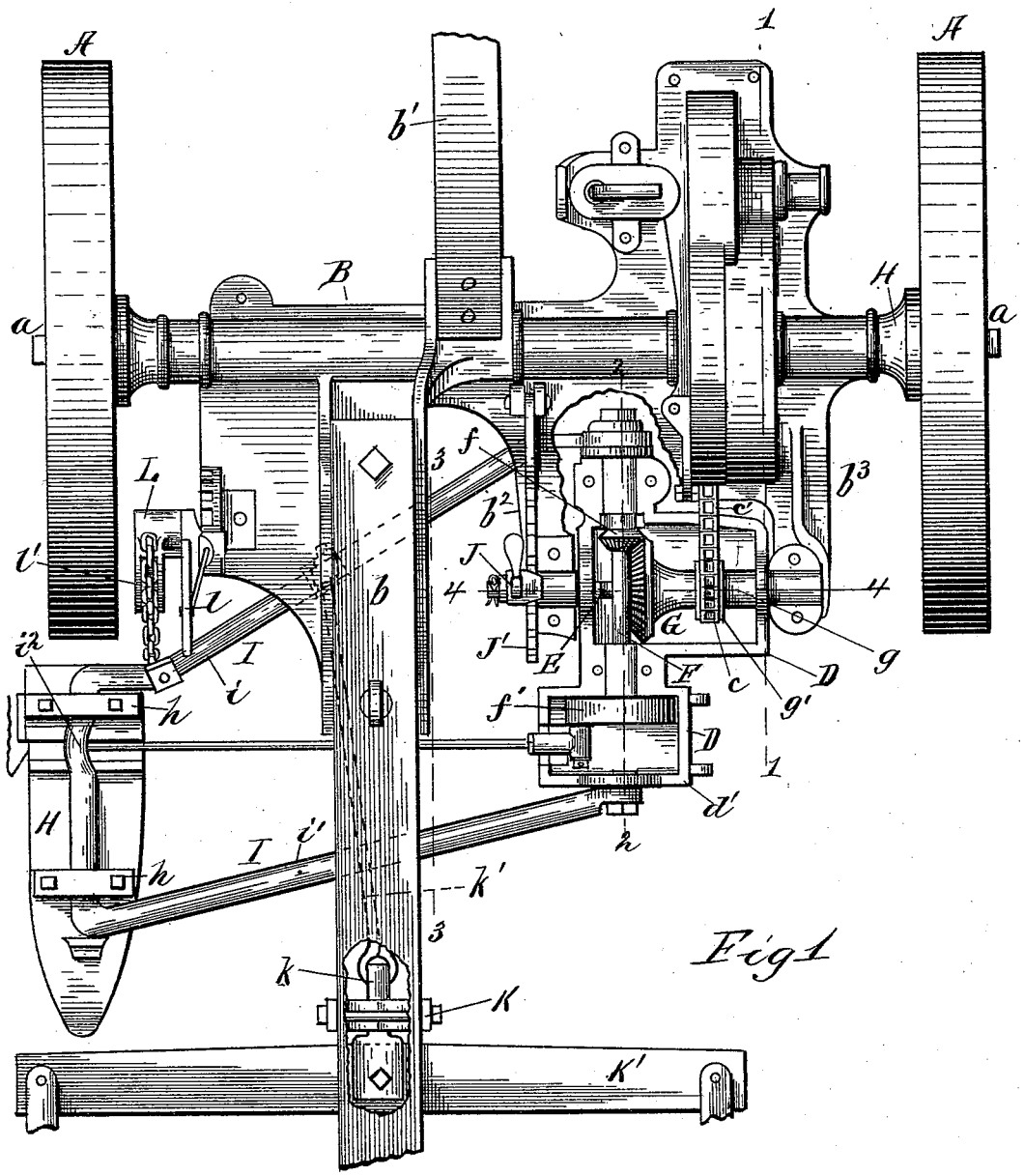

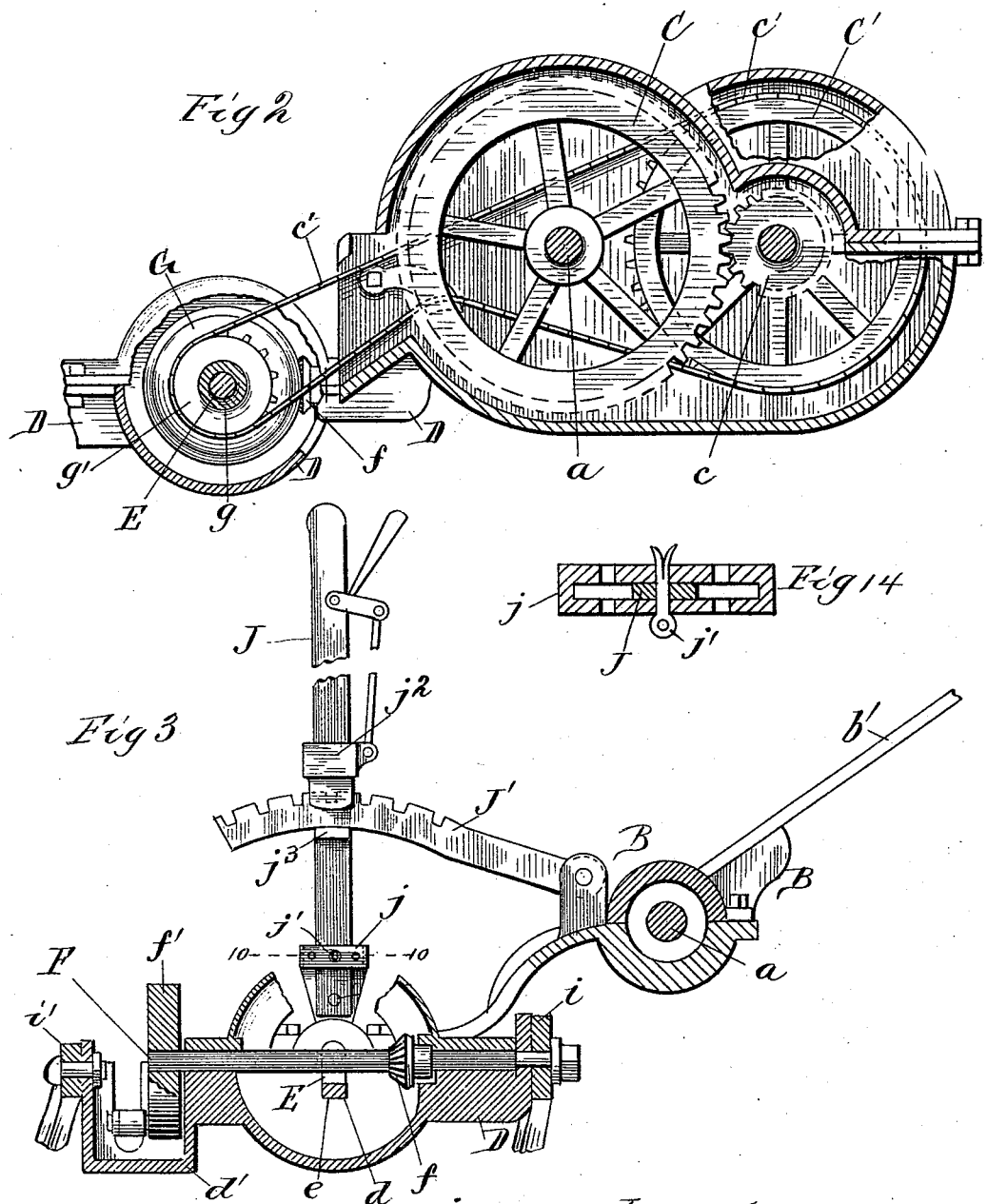

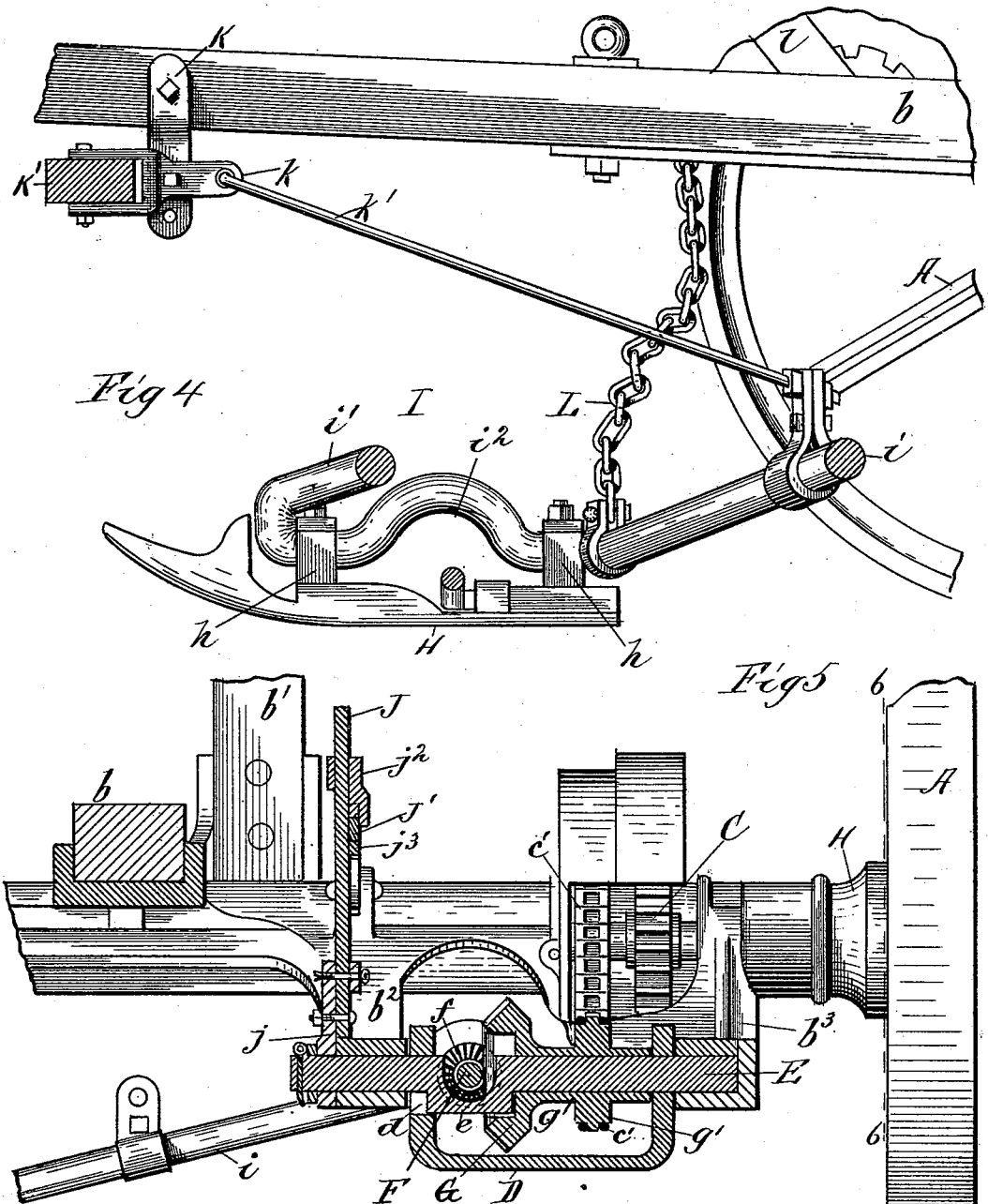

G. G. HUNT.
MOWING MACHINE.

No. 459,443. Patented Sept. 15, 1891.

Witnesses
N. C. Coolies
A. M. Best

Inventor
George G. Hunt
By Coburn & Thacher
Attys

UNITED STATES PATENT OFFICE.

GEORGE G. HUNT, OF BRISTOL, ASSIGNOR TO THE PLANO MANUFACTURING COMPANY, OF CHICAGO, ILLINOIS.

MOWING-MACHINE.

SPECIFICATION forming part of Letters Patent No. 459,443, dated September 15, 1891.

Application filed May 3, 1889. Serial No. 309,491. (No model.)

*To all whom it may concern:*

Be it known that I, GEORGE G. HUNT, a citizen of the United States, residing at Bristol, in the county of Kendall and State of Illinois, have invented certain new and useful Improvements in Mowing-Machines, which are fully set forth in the following specification, reference being had to the accompanying drawings, in which—

Figure 6:
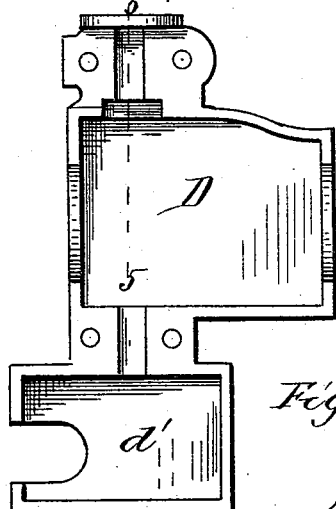
Figure 7:
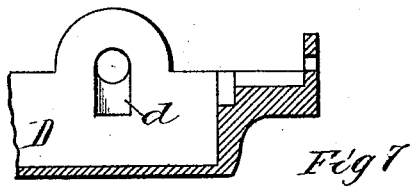
Figure 8:
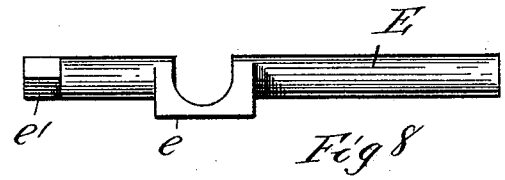
Figure 9:
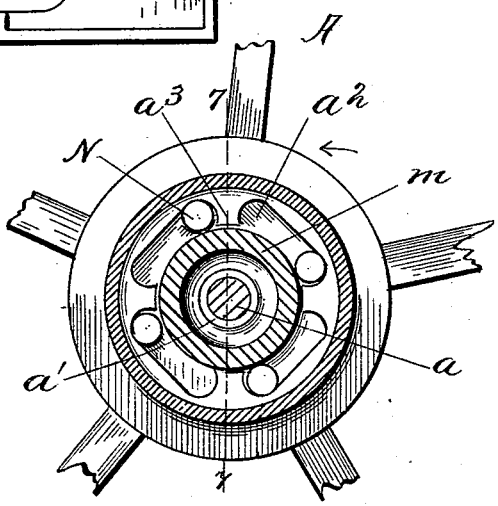
Figure 10:
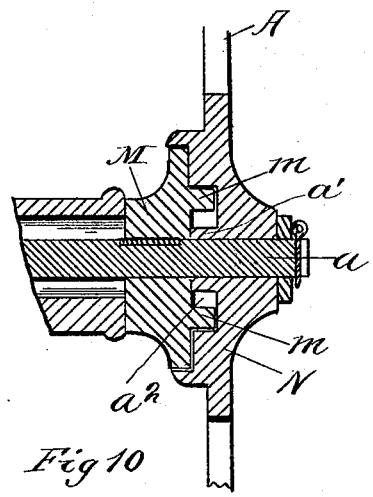
Figure 11:
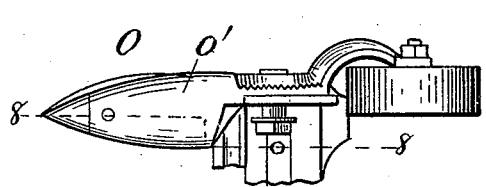
Figure 12:
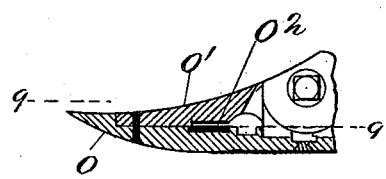
Figure 13:
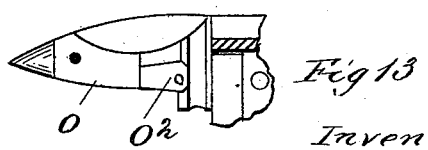

Figure 1 represents a plan view of a machine embodying my improvements; Fig. 2, a vertical section taken on the line 1 1 of Fig. 1; Fig. 3, a similar section taken on the line 2 2 of Fig. 1; Fig. 4, a similar section taken on the line 3 3 of Fig. 1; Fig. 5, a similar section taken on the line 4 4 of Fig. 1; Fig. 6, a detail plan of the pivoted frame which carries the crank-shaft and to which the finger-beam is connected; Fig. 7, a section of the same, taken on the line 5 5 of Fig. 6; Fig. 8, a detail elevation of the pivot-shaft on which this frame is mounted; Fig. 9, a detail section taken on the line 6 6 of Fig. 5; Fig. 10, a similar section taken on the broken line 7 7 of Fig. 9; Fig. 11, a detail plan of the outer end of the finger-beam with outer shoe and divider; Fig. 12, a section of the same, taken on the broken line 8 8 of Fig. 11; Fig. 13, a plan section of the same, taken on the broken line 9 9 of Fig. 12; and Fig. 14, an enlarged detail section taken on the line 10 10 of Fig. 3. Fig. 1 is on a scale by itself, the remaining figures of the drawings being upon an enlarged scale.

My invention relates to a two-wheeled hinged joint mowing-machine, the present improvements being more especially directed to the means for coupling the finger-beam to the main or gearing frame of the machine, the mounting of the crank-shaft and its immediate driving devices, the attachment of the draft, the clutch for connecting the drive-wheels to the axle, the outer shoe and divider, and other minor parts of the machine, as will hereinafter more fully appear.

I will proceed to describe one form in which I have embodied my invention in a practical working machine, and will then point out specifically in claims the improvements which I believe to be new and wish to secure by Letters Patent.

In the drawings, A A represent the two supporting or drive wheels of the machine, and $a$ the main axle on which they are mounted. A main frame B is also mounted on this axle between the wheels, to which the pole $b$ is secured and on which is located the seat-support $b'$. The main frame extends in front and rear of the axle, as shown in Fig. 1 of the drawings. A gear-wheel C is fastened to the main axle and engages with a gear-pinion $c$ on a counter-shaft mounted on the rear portion of the main frame, which also carries a chain-wheel C', secured to the same shaft or connected to the pinion C, so as to be driven by it. A chain $c'$ is applied to this wheel and is carried forward to the front part of the frame to drive the crank-shaft, as will presently be described.

The main frame is branched in front of the axle, two arms or branches $b^2$ $b^3$ projecting forward between the pole-plate and the outer main wheel. A small supplementary frame D is provided, being adapted to fit between the two branches of the main frame. The general shape of this frame is seen in Fig. 6 of the drawings, and it is also adapted to receive the crank-shaft and its immediate driving-shaft and is preferably cast in one piece. This frame D is mounted on a cross pivot-bar E, which, in turn, is mounted in suitable bearings at the front ends of the aforesaid front arms of the main frame, so as to be parallel with the main axle and free to turn in these bearings. The shape of the pivot-bar is seen in Fig. 8 of the drawings, it being provided, as there shown, with an angular bend $e$, which provides an angular recess or depression in the bar. On the side next to the outer wheel of the machine this pivot-bar simply passes through a suitable aperture in the side flange of the frame and on the outside thereof is properly seated in its bearing on the outer branch of the main frame, as seen in Fig. 5 of the drawings; but on the opposite side of the frame the side flange is cut out slightly on its inner face to provide a shallow rectangular recess and seat $d$, which is adapted to receive the rectangular projection formed by the bend in the pivot-bar mentioned above. When this pivot-bar is set in place, one shoulder of the bend will be seated in this recess, as seen in Fig. 5 of the drawings, and thence the end of the bar is extended inward and properly mounted outside of the frame in its journal-bearing on the inner branch of the main frame, beyond which it also extends and terminates outside thereof in an angular section $e'$, as seen in Fig. 8 of the drawings. It is evident that with this construction the supplementary frame and the pivot-bar are locked together, so that the former will not turn upon the latter; but when the bar is turned or rocked in its bearings the frame will be vibrated with it, the bearings of the pivot-bar being the center of vibration.

The crank-shaft F is mounted in suitable bearings at the front and rear of the supplementary frame and at right angles to the pivot-bar of said frame, the bend or depression in the said bar being adapted to receive the crank-shaft, so that it may lie in about the same plane as the bar, this arrangement being seen in Fig. 5 of the drawings. The crank-shaft is provided with a bevel-pinion $f$ and at its front end with a crank or crank-wheel $f'$, to which the pitman of the cutter-bar is connected, the crank-wheel being protected partially by the front portion of the supplementary frame, which is bent down forward and upward to partially surround the crank-wheel, a kind of cup $d'$ being formed, as seen in Fig. 3 of the drawings.

A bevel-wheel G is mounted loosely on the pivot-bar of the supplementary frame, being arranged to engage with the bevel-pinion on the crank-shaft. This bevel-wheel is sleeved upon the pivot-bar by means of a long sleeve $g$, extending outward to the side of the frame, and upon this sleeve is fastened a sprocket-pinion $g'$, over which the driving-chain $c'$ runs, thereby revolving the bevel-wheel and so communicating the necessary motion to the crank-shaft, as will be readily understood.

The finger-beam is attached to the inner shoe H, and is coupled to the main frame through this shoe by means of a coupling-frame I, which in this instance is composed of a single piece of suitable metal bent in form to provide two branches $i$ $i'$, which are hinged, respectively, to the front and rear ends of the pivoted supplementary frame, preferably in line with the crank-shaft, as seen in Fig. 1 of the drawings. The central portion of this coupling-frame is shaped to form the joint for the shoe, in which it is mounted in suitable bearings $h$ $h$, whereby the shoe is hinged or pivoted to the coupling-frame. This central portion is bent upward between its pivot-bearings, thereby forming an arch $i^2$ above the pitman and inner end of the cutter-bar to accommodate the usual movement of these parts. This construction provides a double-hinged coupling whereby the finger-beam is connected to the main frame, this connection being through the pivoted supplementary frame which is carried by the main frame. Now it is evident that whenever the supplementary frame is rocked upon its pivot-bearings the finger-beam will also be rocked or tilted by reason of its connection with the supplementary frame, as just described. This movement for the purpose of tilting or rocking the finger-beam is accomplished by a hand-lever J, the lower end of which is pivoted to a socket-piece $j$, which is rigidly attached to the angular end of the bar. The socket is flaring, so that the lever has some movement back and forth therein, and a pin or pins $j'$ are inserted in one or more holes through the upper part of the socket, whereby this free movement is regulated, or the lever fastened rigidly to the socket by passing the pin through both, as shown in Fig. 14. The lever is also provided with a latch $j^2$, which engages with notches in a rack-bar J', pivoted at one end to the main frame and extending forward and passing through guides $j^3$ on the lever, so that it is held up in place, although left free at its forward or outer end. Now it is obvious that the supplementary frame will rock freely upon its pivot-bearings within limits determined by the adjustment of the pins, and so will permit the free rocking or tilting of the finger-beam to a certain extent as it is drawn over the ground. When it is desired to tilt the finger-beam to a greater degree, it is accomplished by vibrating the lever, which, striking its stop in either direction, turns the socket-piece, and so rocks the supplementary frame and with it tilts the finger-beam, as desired, and by the engagement of the latch on the lever with the rack-bar the finger-beam may be secured in any position to which it may be adjusted.

A hanger or bracket K is pivoted to the pole and depends therefrom. In this hanger is mounted the draft-clip $k$, which is pivoted to the hanger. A draft-rod $k'$ is attached at one end directly to this clip and extends backward to the coupling-frame, to the rear member of which it is connected, as shown in Fig. 4 of the drawings. The doubletree K' is pivoted to the draft-clip in the usual way. The draft is therefore applied directly to the finger-beam, or rather the coupling-frame which connects said beam with the main frame, and this draft connection is applied directly by means of two pieces only, the draft being directly through the clip to which both the doubletree and the draft-rod are attached. A chain L is connected to the rear arm of the coupling-frame close to the shoe, by means of which, through a lever $l$, attached to a sector $l'$, the inner end of the finger-beam may be lifted. The drive-wheels are loose on the main axle, but are clutched to the latter by a friction device which I will now explain. The hub of the wheel is enlarged and the inner face is cut out or recessed, as shown in Fig. 9 of the drawings. The central portion is entirely cut away, except a thin ring next to the axle, so as to leave a collar $a'$ embracing the axle, as seen in Fig. 10 of the drawings. The outer portion of the recess is cut out in sections to form a series of cam-recesses $a^2$ around the hub of the wheel, as seen in Fig. 9. These recesses are of the same shape at each end, being rounded or circular, and are wider at the ends than at the central portion, which is cut away to a less extent outward, so that the outer faces of the recesses will be at the central portion nearly a straight line tangential to the hub; but at each end the circular recesses widen outward toward the circumference, as seen in Fig. 9. It will be seen that there will be left short projections $a^3$, extending radially toward the center of the hub and separating the cam-recesses just described from each other. A circular friction plate or collar M is mounted on the axle and fastened thereto just inside of each wheel. This plate has a circular flange $m$ upon its outer face, which is adapted to enter the recess in the face of the hub opposite, just about fitting against the inner ends of the projections $a^3$. When the wheel is in place on the axle, the friction-plate is received within an inwardly-extending flange upon the enlarged hub, as seen in Fig. 10 of the drawings, and it is evident that a series of separate pockets or recesses will now be formed around the hub by the flange on the friction-plate, which substantially closes the mouth of opening to the cam-recesses just described.

In applying the wheels to the axle friction balls or rollers N are placed within these recesses, one in each, their size being such that at either end of the cam-recesses they will be forced down upon the flange on the friction-plate, and at the central portion of the recesses the space is not sufficient to permit the balls to pass from one end of the recess to the other. It will be seen then that when the wheels are turned forward they will be clutched to the axle by the balls clamped down at the back end of the recesses upon the flange of the friction-plate, which is fast on the axle, as seen in Fig. 9 of the drawings, the wheel being turned in the direction indicated by the arrow. If the wheel is turned back, the clutch is released, as is usual in this type of device. By making the recesses for the clutch balls or rollers with duplicate cams, one at each end, as described above, it is evident that it is immaterial on which side the wheels are respectively applied. The clutch is a right-and-left clutch operating in the same way, whether the particular wheel to which it is applied is put on the right or left hand of the machine. The wheels are therefore exchangeable and no special attention is required in setting up the machine.

The outer shoe O is of any ordinary construction, except in one particular. This shoe is usually made entire, or at least the front portion of it. Instead of this construction I make the shoe in two pieces, a lower part $o$ and an upper portion or cap $o'$ in a separate piece, which is adapted to fit the lower and be fastened thereto by bolts or rivets, as seen in Figs. 11 and 12 of the drawings. The advantage obtained by this construction is that it makes it possible to apply a ledger-plate $o^2$ to this outer shoe, which is not possible when the shoe is made entire, and so there has been heretofore some difficulty experienced in the cut made against this shoe. It is evident that with the cap or upper portion made a separate piece from the lower portion a ledger-plate is readily applied to the latter and then the cap is put in place and the two parts properly fastened together.

It will be seen from the description already given of the rocking supplementary frame and the attachment thereto of the finger-beam that the relation between the crank-shaft and the finger-beam is a permanent one. The crank-shaft and its immediate driving devices are all mounted on the supplementary frame, so that when the latter is rocked to tilt or rock the finger-beam the crank-shaft is correspondingly vibrated and the coupling-frame is jointed to the rocking frame in line with the crank-shaft. Hence the relation of the crank-shaft to the finger-beam is always the same. It is obvious, also, that the rocking of the supplementary frame and accompanying tilting of the finger-beam occasions no disturbance in the driving of the crank-shaft, for the chain-pinion, through which motion is communicated to the said shaft, is mounted concentrically with the center of vibration of the said frame, so that the rocking of the latter does not disturb the relation of this pinion to its driving-wheel on the main axle.

I do not wish to be understood as limiting myself to all the details of construction herein described and shown, for the main features of my invention may be very considerably changed in special construction and arrangement and yet the characteristics which mark my improvements may be fully retained.

Having thus described my invention, what I claim as new, and desire to secure by Letters Patent, is—

1. In a mowing-machine, the main frame, in combination with the tongue rigidly connected thereto, and the crank-shaft frame or housing pivoted at a point between its ends transversely upon the main frame, so as to swing in front of the axle, substantially as described.

2. In a mowing-machine, a main frame, in combination with a rocking supplementary frame pivoted to the former in bearings parallel to the main axle, the crank-shaft mounted in bearings on said supplementary frame, the driving-gearing for driving said crank-shaft from the main axle, the finger-beam, and a coupling-frame hinged at one end to the finger-beam and at the other to the said supplementary frame, substantially as and for the purposes specified.

3. In a mowing-machine, the main frame, in combination with a supplementary frame mounted in pivot-bearings on said main frame, which are parallel to the main axle, the crank-shaft mounted in bearings on the supplementary frame at right angles to the line of its pivot-bearings, the finger-beam, and a coupling-frame hinged to said finger-beam at one end and at the other to the supplementary frame in line with the crank-shaft, substantially as and for the purposes specified.

4. The main frame, in combination with the rocking supplementary frame D, provided with seat $d$, the pivot-bar E, provided with an angular section $e$, adapted to fit the seat $d$, the crank-shaft mounted on the supplementary frame, and the finger-beam hinged to said frame, substantially as and for the purposes specified.

5. The main frame, in combination with the supplementary frame D, provided with seat $d$, the pivot-bar E, provided with an angular section $e$, adapted to fit the seat $d$, and with a bend $e'$, and the crank-shaft F, arranged across the pivot-bar and lying in the bend $e'$ thereof, substantially as and for the purposes specified.

6. The main frame, in combination with the rocking supplementary frame D, pivoted to the former parallel to the main axle, the crank-shaft F, mounted on the supplementary frame and provided with a bevel-pinion $f$, the shoe H, the coupling-frame I, hinged to the shoe and also the supplementary frame, the bevel-wheel G, sprocket-pinion $g'$, connected thereto and mounted on the pivot-bar of said frame, the driving-chain $c'$, the chain-wheel C', and gearing whereby the latter is driven from the main driving-wheels, substantially as and for the purposes specified.

7. In a mowing-machine, the main axle, in combination with the main wheels, the hubs of which are provided with double cam-recesses $a^2$, the cam at each end of the recess being the same, a friction-plate M, attached to the axle and provided with a flange $m$, and the friction-rollers N, substantially as and for the purposes specified.

GEORGE G. HUNT.

Witnesses:
CARRIE FEIGEL,
IRVINE MILLER.